(12) United States Patent
Howell et al.

(10) Patent No.: US 12,559,259 B2
(45) Date of Patent: Feb. 24, 2026

(54) AIRCRAFT TEST SYSTEM

(71) Applicants: Airbus Operations Limited, Bristol (GB); Airbus Operations (S.A.S), Toulouse (FR)

(72) Inventors: George Howell, Bristol (GB); Ting Yu Au, Bristol (GB); Jonathan Cooper, Bristol (GB); Asier Perez, Bristol (GB); Laura Capelleras Magana, Bristol (GB); David James Scott, Bristol (GB); Sushmita Gudimella, Bristol (GB)

(73) Assignees: AIRBUS OPERATIONS LIMITED, Bristol (GB); AIRBUS OPERATIONS (S.A.S.), Toulouse (FR)

( * ) Notice: Subject to any disclaimer, the term of this patent is extended or adjusted under 35 U.S.C. 154(b) by 211 days.

(21) Appl. No.: 18/347,336

(22) Filed: Jul. 5, 2023

(65) Prior Publication Data

US 2024/0025563 A1 Jan. 25, 2024

(30) Foreign Application Priority Data

Jul. 5, 2022 (GB) ...................................... 2209896

(51) Int. Cl.
B64F 5/60 (2017.01)
B60T 8/17 (2006.01)
(Continued)

(52) U.S. Cl.
CPC .............. B64F 5/60 (2017.01); B60T 8/1703 (2013.01); B64C 25/42 (2013.01);
(Continued)

(58) Field of Classification Search
CPC ........... B64F 5/60; B64C 25/42; G06N 20/00; G05B 2219/21002; G05B 23/0254; G05B 23/0281; B60T 8/1703
See application file for complete search history.

(56) References Cited

U.S. PATENT DOCUMENTS

| | | | |
|---|---|---|---|
| 9,944,404 B1 * | 4/2018 | Gentry ................... | B64D 45/00 |
| 10,239,640 B2 | 3/2019 | Ethington et al. | |
| 2016/0358099 A1 | 12/2016 | Sturlaugson et al. | |
| 2021/0300528 A1 * | 9/2021 | Howell ................... | B64C 13/50 |
| 2022/0048648 A1 * | 2/2022 | Aaron ................... | F01D 21/003 |

FOREIGN PATENT DOCUMENTS

| | | |
|---|---|---|
| CN | 112580718 A | 3/2021 |
| EP | 3 885 255 A1 | 9/2021 |

(Continued)

OTHER PUBLICATIONS

Extended Search Report cited in 23183271.8 mailed Nov. 27, 2023, 12 pages.

(Continued)

*Primary Examiner* — Ramsey Refai
*Assistant Examiner* — Zachary E. F. Glade
(74) *Attorney, Agent, or Firm* — Nixon & Vanderhye P.C.

(57) ABSTRACT

A test apparatus and method for testing a trained classifier configured to control an aircraft system. Scenario data includes operating inputs representing an operational state of an aircraft and classifier outputs for controlling the aircraft system, is obtained. Model data representing a model of the at aircraft system is obtained. Error categorisation data for each aircraft operating scenario is generated based on respective classifier outputs applied to the model.

20 Claims, 10 Drawing Sheets

(51) Int. Cl.

| | | |
|---|---|---|
| *B64C 25/42* | (2006.01) | |
| *G05B 23/02* | (2006.01) | |
| *G06N 20/00* | (2019.01) | |

(52) U.S. Cl.

CPC ..... *G05B 23/0254* (2013.01); *G05B 23/0281* (2013.01); *G06N 20/00* (2019.01); *G05B 2219/21002* (2013.01)

(56) References Cited

FOREIGN PATENT DOCUMENTS

| | | | | | |
|---|---|---|---|---|---|
| GB | 2 590 671 | A | 7/2021 | | |
| GB | 2598530 | A | 3/2022 | | |
| WO | WO-2021063830 | A1 * | 4/2021 | ........... | G06F 18/214 |
| WO | WO-2021130061 | A1 * | 7/2021 | ............. | B64D 31/06 |

OTHER PUBLICATIONS

O. Bamigboye, et al., "Intelligent Automatic Car Braking Control System Using Neural Network Classifier", International Journal of Engineering Inventions, e-ISSN: 2278-7461, p. ISSN: 2319-6491 Inventions, vol. 5, Issue 6, Jun. 2016, pp. 51-56 (6 pages).

Harish Senthil Kumar, et al., "Brake Health Prediction Using LogitBoost Classifier Through Vibration Signals—A Machine Learning Framework", International Journal of Prognostics and Health Management, ISSN 2153-2648, Oct. 29, 2021, 8 pages.

R. Jegadeeshwaran, et al., "Brake fault diagnosis using Clonal Selection Classification Algorithm (CSCA) A statistical learning approach", Engineering Science and Technology, an International Journal, vol. 18, Mar. 2015, pp. 14-23, Online: https://www.sciencedirect.com/science/article/pii/S221509861400055X?via%3Dihub.

* cited by examiner

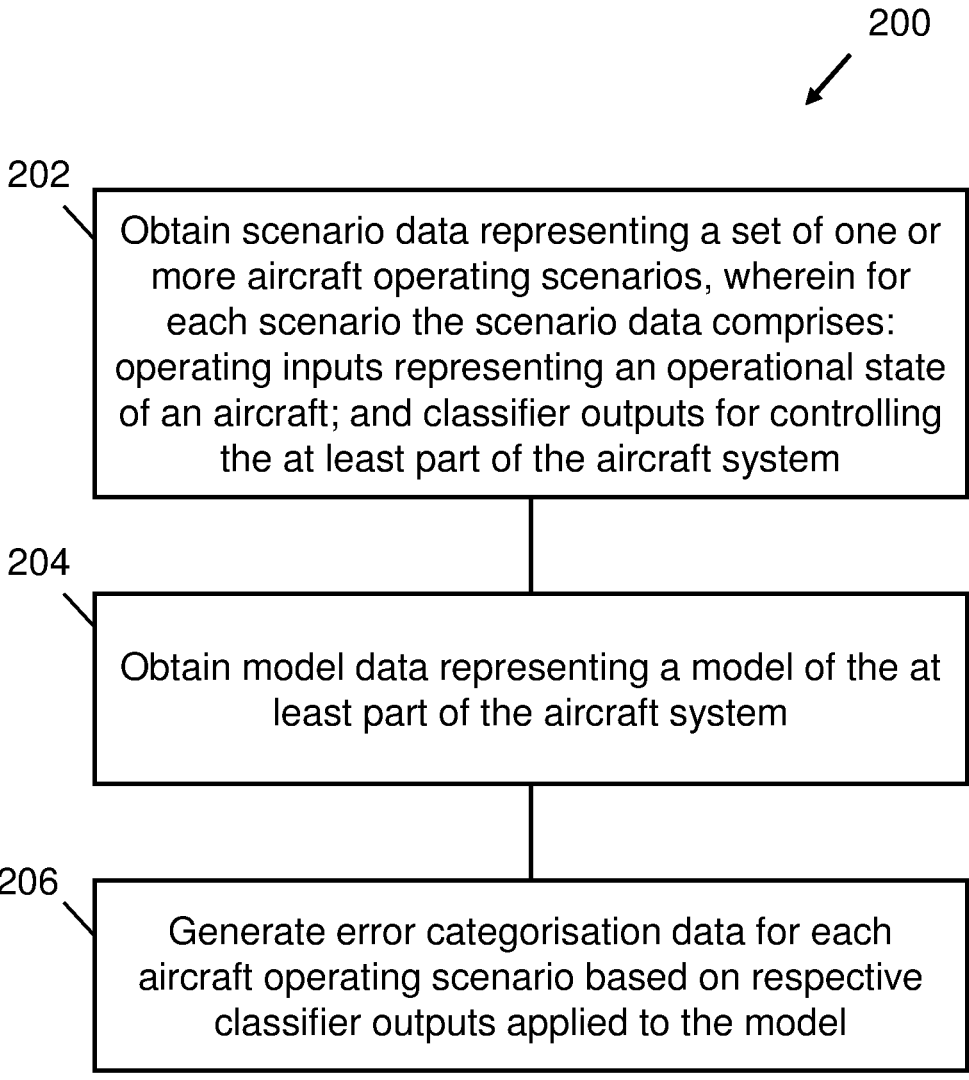

200

202

Obtain scenario data representing a set of one or more aircraft operating scenarios, wherein for each scenario the scenario data comprises: operating inputs representing an operational state of an aircraft; and classifier outputs for controlling the at least part of the aircraft system

204

Obtain model data representing a model of the at least part of the aircraft system

206

Generate error categorisation data for each aircraft operating scenario based on respective classifier outputs applied to the model

*FIG. 2*

AIRCRAFT TEST SYSTEM

RELATED APPLICATION

This application incorporates by reference and claims priority to United Kingdom patent application GB2209896.6, filed Jul. 5, 2022.

TECHNICAL FIELD

The present disclosure relates to test apparatus for aircraft systems. In particular, but not exclusively, the present disclosure relates to testing aircraft systems comprising trained classifiers.

BACKGROUND

Aircraft typically comprise control systems, which are developed by devising rules to govern the operation of the aircraft control system in a range of scenarios and coding these rules into the aircraft control system. Developing these control systems generally involves a considerable amount of time and planning. While techniques involving artificial intelligence may be employed and may decrease the time taken to develop such systems, sufficient trust has to be afforded to such techniques before they are considered to be dependable.

SUMMARY

A first aspect of the present invention provides test apparatus for testing a trained classifier configured to control at least part of an aircraft system, the apparatus comprising a least one memory and at least one processor, the test apparatus comprising program code stored in the at least one memory and, when executed by the at least one processor, causes the test apparatus to: obtain scenario data representing one or more aircraft operating scenarios, wherein for each scenario the scenario data comprises: operating inputs representing an operational state of an aircraft; and classifier outputs for controlling the at least part of the aircraft system, the classifier outputs being generated by processing the operating inputs using the trained classifier; obtain model data representing a model of the at least part of the aircraft system; and generate error categorisation data for each aircraft operating scenario based on respective classifier outputs applied to the model In this way, the performance of a trained classifier which is to be used to operate at least part of an aircraft system can be evaluated. Generating error categorisation data allows testers of aircraft systems to more readily identify whether the trained classifier needs modifying and in what manner. In general, when trained classifiers perform unexpectedly it can be difficult to determine a cause of the unexpected behaviour. Providing more granular error categorisation data may allow a developer to more efficiently troubleshoot and/or identify a cause of unexpected behaviour from a trained classifier. This in turn may help shorten and simplify the troubleshooting aspects of development, allowing aircraft systems comprising trained classifiers to be developed more quickly.

Optionally, for a said scenario, generating the error categorisation data comprises evaluating how the model would operate when controlled using the respective classifier outputs.

The model replicates the operation of the at least part of an aircraft system when it is controlled using the respective classifier outputs. By assessing how the model operates according to these classifier outputs, it becomes possible to quickly evaluate the respective classifier outputs and how they would perform if used to control the at least part of the aircraft system.

Optionally, for a said scenario, generating the error categorisation data comprises: modifying the model represented by the model data according to respective operating inputs; and evaluating how the modified model would operate when controlled using the respective classifier outputs.

The operating inputs may specify whether certain functions or components within the aircraft system are available in a given scenario. By modifying the model according to the operating inputs for each scenario before evaluating the respective classifier outputs, it becomes possible to evaluate complex operating scenarios in which the conditions in the aircraft system vary.

Optionally, for each scenario the scenario data comprises operating outputs for controlling the at least part of the aircraft system, the operating outputs being generated by operating the at least part of the aircraft system based on respective operating inputs, and wherein, for a said scenario, generating the error categorisation data comprises evaluating how the model would operate when controlled using respective classifier outputs in comparison to how the model would operate when controlled using respective operating outputs.

Comparing a difference between how the model operates according to classifier outputs and the operating outputs enables the test apparatus to identify and categorise errors which are more difficult to identify than other types of error.

Optionally, the model is a graph model comprising a set of nodes connected by a corresponding set of directed edges, each node representing a function of a component in the at least part of the aircraft system, and wherein generating error categorisation data for a said aircraft operating scenario comprises: mapping respective classifier outputs to nodes in the graph model to identify nodes that are activated according to the respective classifier outputs; and evaluating how the model operates according to the activated nodes.

Graph models provide efficient methods for modelling complex systems including the interdependencies between components and functions which are available in aircraft systems.

Optionally, the error categorisation data for a said scenario is indicative of: whether an error is detected in the respective classifier outputs; and, in the event that an error is detected in the respective classifier outputs, an error category for the detected error.

Providing specific categorisation for each error allows developers of the trained classifier to more quickly identify a potential source of an error in the trained classifier.

Optionally, the error category is one of a plurality of error categories, and wherein the plurality of error categories comprises any two or more of: a first error category that is indicative of an operation of two components in the at least part of the aircraft system that are incompatible; a second error category that is indicative of a simultaneous operation of a component in the at least part of the aircraft system according to two contradictory operation modes; a third error category that is indicative of an operation of a component in the aircraft system in a manner that is incompatible with the said scenario; and a fourth error category indicative of an incomplete operation of the at least part of the aircraft system for the said scenario.

In this way, specific categories of error which can arise from different sources can be identified.

Optionally, for each scenario the scenario data comprises operating outputs for controlling the at least part of the aircraft system, wherein the operating outputs are generated by operating the at least part of the aircraft system based on respective operating inputs, and wherein the program code, when executed by the at least one processor, causes the test apparatus to: process the error categorisation data to identify a first subset of the scenarios for which no error is detected; and process scenario data corresponding to the first subset of scenarios to identify a second subset of scenarios for which an operation of the model when controlled using the respective classifier outputs differs to an operation of the model when controlled using the respective operating outputs.

In this way it is possible to identify behaviour of the trained classifier in certain scenarios which, while not associated with erroneous behaviour, differs to the behaviour of the expected output from a known aircraft operating system. Identifying differences between the behaviour of the trained classifier and known aircraft systems allows developers to retrain the trained classifier to more closely match the operation of the known aircraft systems.

Optionally, the program code, when executed by the at least one processor, causes the test apparatus to: evaluate a performance of the respective classifier outputs corresponding to the second subset of scenarios; and generating evaluation data indicative of the performance of the respective classifier outputs corresponding to the second subset of scenarios.

In this way, it is possible to determine whether the differences in behaviour between the trained classifier and the known aircraft systems are acceptable and/or whether modifications to the trained classifier should be made.

Optionally, for at least one of the second subset of scenarios the evaluation data indicates whether respective classifier outputs corresponding to the at least one of the second subset of scenarios meet a predetermined performance threshold.

In this way it is possible to obtain an objective measure of the performance of the trained classifier which indicates whether the trained classifier needs to modified and/or retrained.

Optionally, the aircraft system is a braking control system.

Optionally, the aircraft control system comprises a fuel control system.

A second aspect of the present invention provides a computer-implemented method for testing a trained classifier configured to control at least part of an aircraft system, the computer-implemented method comprising: obtaining scenario data representing one or more aircraft operating scenarios, wherein for each scenario the scenario data comprises: operating inputs representing an operational state of an aircraft; and classifier outputs for controlling the at least part of the aircraft system, the classifier outputs being generated by processing the operating inputs using the trained classifier; obtaining model data representing a model of the at least part of the aircraft system; and generating error categorisation data for each aircraft operating scenario based on respective classifier outputs applied to the model.

A third aspect of the present invention provides a non-transitory computer-readable storage medium comprising computer-executable instructions which, when executed by at least one processor, cause the at least one processor to perform a computer-implemented method according to the second aspect.

A fourth aspect of the present invention provides a test system comprising the test apparatus according to the first aspect and the at least part of the aircraft system.

BRIEF DESCRIPTION OF THE DRAWINGS

Embodiments of the invention will now be described, by way of example only, with reference to the accompanying drawings, in which:

FIG. 2 is a flow chart of a computer-implemented method according to an example;

DETAILED DESCRIPTION

Figure 1:
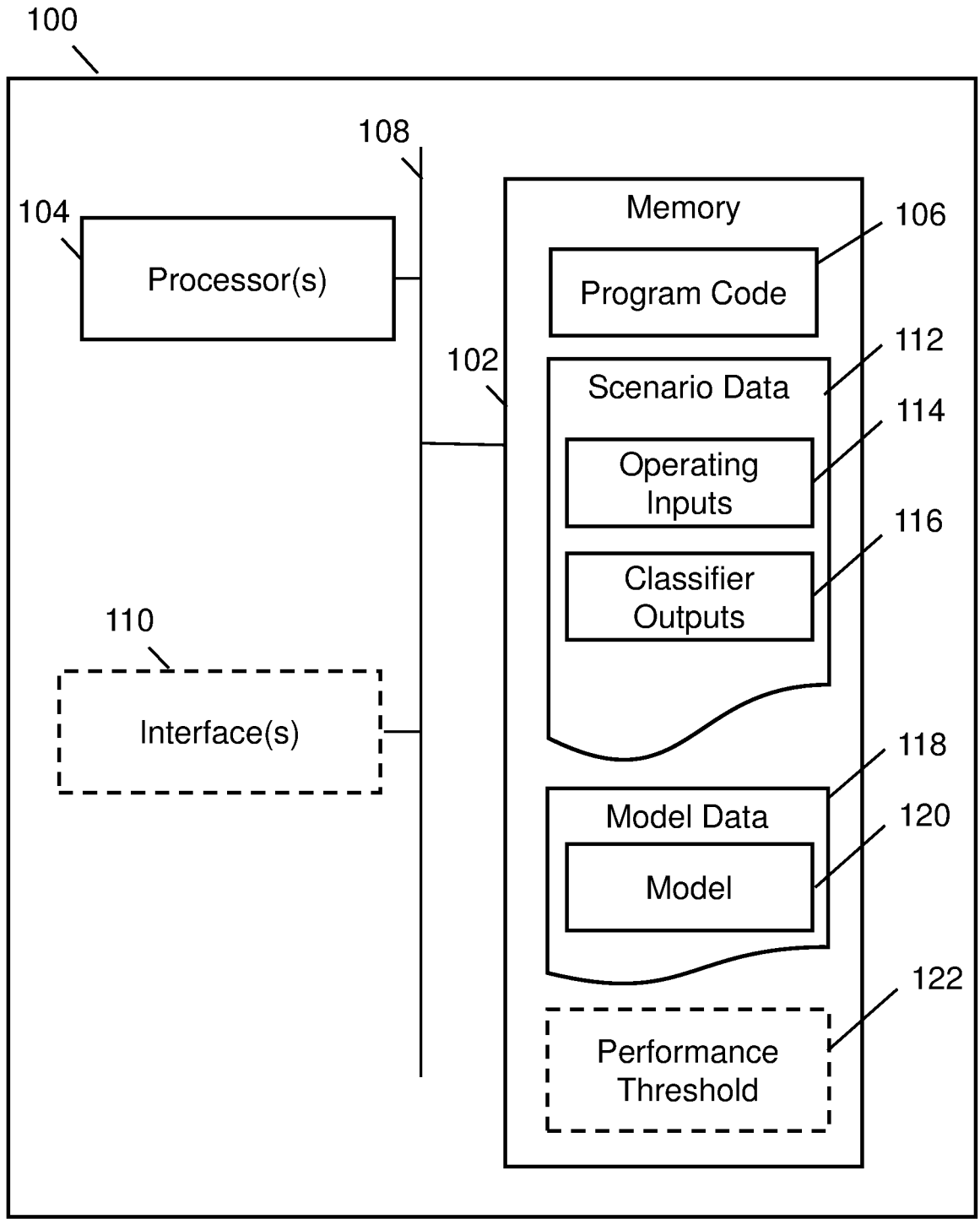
FIG. 1 is a schematic diagram of a test apparatus according to an example.

Aircraft systems are becoming increasingly complex as performance and safety standards increase. As aircraft systems have grown in complexity, automation has been used, for example 'fly-by-wire', to assist pilots and improve safety of these aircraft. However, developing systems to provide the automation is commensurately increasingly complex.

Designers of aircraft control systems, which are used to provide the automation, are considering the inclusion of trained classifiers in aircraft control systems. The use of artificial intelligence in aircraft control systems, such as through the use of trained classifiers, may be beneficial, for example, to operate an aircraft efficiently even in scenarios that are outside normal operating conditions. Further, aircraft control systems employing artificial intelligence may not be bound by the experience of designers of these systems and so may be capable of identifying and operating the aircraft in more efficient ways than other aircraft control systems which are designed to a fixed specification. This is particularly the case when a new aircraft is being designed, since at least some design parameters associated with existing types of aircraft may not apply to a new aircraft design.

Trained classifiers implemented in aircraft control systems may include any of a plurality of different types of classifiers, such as neural networks, random forest algorithms, naïve Bayes classifiers, support vector machines, linear regression machine learning algorithms or any other suitable algorithm or classifier which is suitable for the function(s) described herein.

When implementing new aircraft control systems, trained classifiers used in aircraft control systems would be rigorously tested to ensure that they behave appropriately when controlling aircraft systems. During the development phase, a plurality of scenarios, in which an expected behaviour of the aircraft system under a set of preconditions and/or controls is known, may be used to test the trained classifier.

Certain regulatory bodies may require that developers of the new aircraft control systems provide evidence in support of the safety and reliability of the new aircraft control systems. Therefore, it would be desirable to implement methods which can be shown to generate sufficient evidence and enforce sufficient safety measures for regulatory bodies to be satisfied as to the safety and reliability of new aircraft control systems comprising trained classifiers.

Certain examples described herein relate to a test apparatus for testing a trained classifier configured to control at least part of an aircraft. The test apparatus processes scenario data, representing the behaviour of the trained classifier in a set of predetermined scenarios, and model data to identify and classify any errors in the way in which the trained classifier is configured to control the aircraft system. The test apparatus evaluates how the model performs when operated using outputs generated by the trained classifier to determine if there are any errors in the way in which the trained classifier controls the aircraft system. For example, it may be determined if there are scenarios in which the trained classifier behaves unexpectedly. By classifying, or categorising, errors in the way the trained classifier operates, more detailed error related information can be obtained which in turn allows the trained classifier to be improved more quickly by developers.

During a development cycle for a trained classifier, after the classifier has been initially trained to control an aircraft system, it is tested to see if it works appropriately for controlling that aircraft system in a plurality of scenarios. In some of the tests which are performed, the trained classifier may provide an output which does not correctly control the aircraft system. These outputs are referred to as errors. Generally trained classifiers operate without transparency and the causes of an error generated by a trained classier are not readily apparent to developers. This increases difficulty when developing trained classifier as it is not always easy to identify what has caused the error. Different sources of error may include poor training data, unsuited classifier architecture for the specific task, incorrect data processing at an input of classifier, and so forth. Generating error classification data 302 allows a developer to narrow down a potential source of an error in a trained classifier during development.

Beneficially, according to examples, the model that is used is a graph model representing the operation of the aircraft system. The graph model enables the outputs from the trained classifier to be readily mapped to different functions and/or components in the aircraft system, and thereby allows any errors to be efficiently identified and categorised.

FIG. 1 shows test apparatus 100 comprising at least one memory 102, at least one processor 104, and program code 106 stored in the at least one memory 102. The at least one memory 102 includes any suitable combination of transitory and non-transitory storage for storing the program code 106, including random-access memory (RAM), read-only memory (ROM), synchronous dynamic random-access memory (SDRAM), or any other suitable type of memory.

The at least one processor 104 may include any one or more of a central processing unit (CPU), a graphics processing unit (GPU), an application specific instruction set processor (ASIP) or any other suitable processing device. The memory 102 and the processor(s) 104 are communicatively coupled over a communications system 108 such as a bus.

The test apparatus 100 may comprise at least one interface 110, shown in broken lines in FIG. 1. Such an interface 110 may be operable to communicate with one or more external computing devices and/or at least part of an aircraft system. The interface(s) 110 may also include a user interface 110 for providing information to a user and/or receiving instructions from a user. In an example, the user interface comprises a graphical display for displaying system information such as status information and/or at least one user input device to receive an input from a user to control the test apparatus 100. The test apparatus 100 is shown in FIG. 1 as a single device. However, it is to be understood that the test apparatus 100 may comprise distributed computing devices, for example a plurality of distributed computing devices communicatively coupled over a wired or wireless network.

The program code 106 stored in the memory 102, when executed by the processor(s) 104, causes the test apparatus 100 to perform a method for testing a trained classifier that is configured to control at least part of an aircraft system. To this end, and as will be discussed further below, the memory 102 may also store scenario data 112, comprising operating inputs 114 and classifier outputs 116, and model data 118 representing a model 120 of at least part of an aircraft system. In some examples, the memory 102 also stores performance threshold data 122 as will be described further below. The method for testing the trained classifier, implemented by the test apparatus 100, will now be described below with respect to FIGS. 2 to 8.

Figure 3:
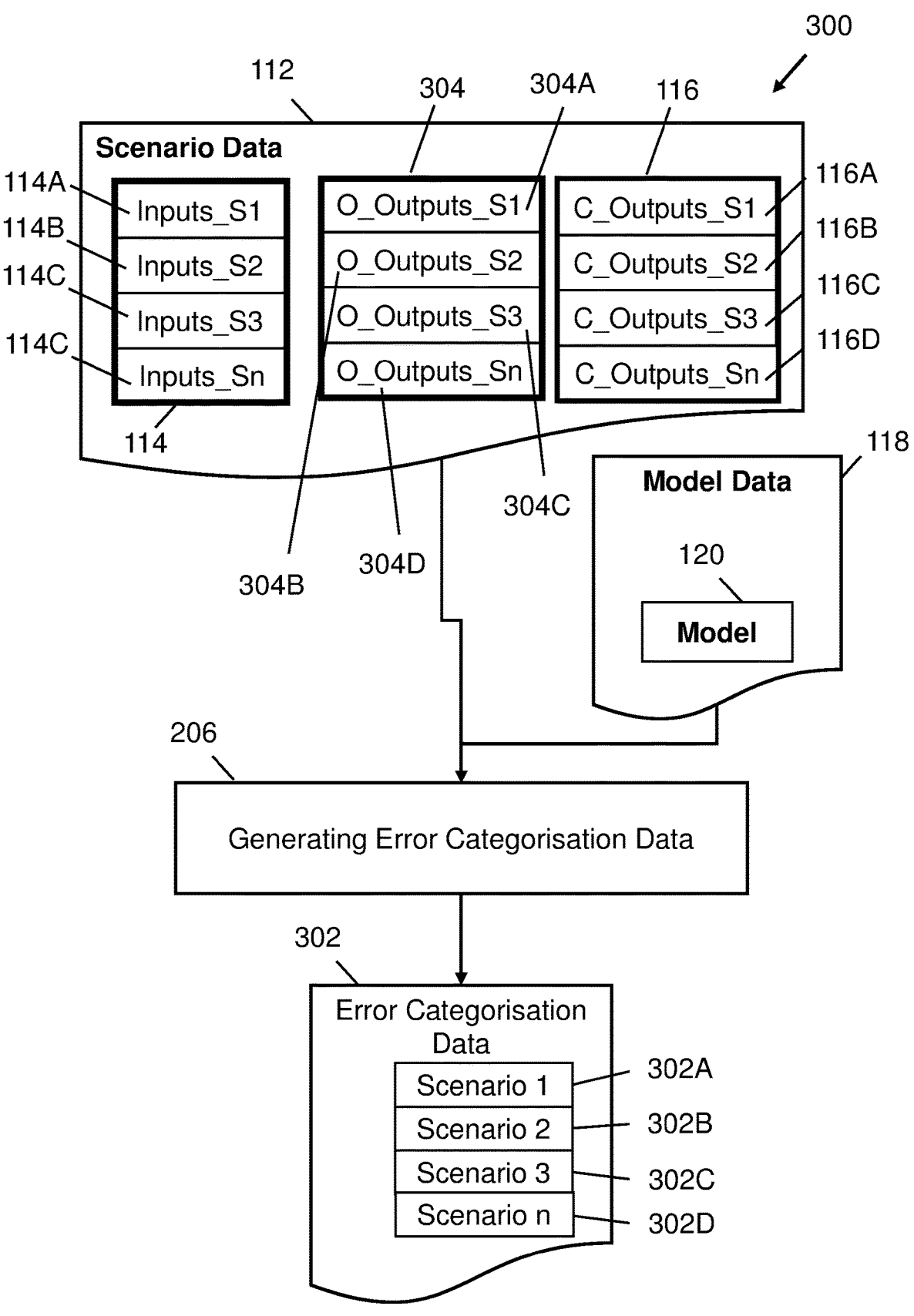
FIG. 3 is a schematic diagram illustrating the method according to an example.

FIG. 2 shows a computer-implemented method 200, which is implemented by the aircraft control system 100, in the form of a flow chart, while FIG. 3 shows the method 200 in the form of a schematic diagram 300. The method 200 comprises obtaining 202 scenario data 112 representing one or more aircraft operating scenarios. The scenario data 112 includes operating inputs 114 and classifier outputs 116 for each scenario. An aircraft operating scenario is the combination of an operational state of an aircraft, for example, due to technical and/or environmental conditions, and the manner in which the aircraft is controlled in this operational state.

The operating inputs 114 represent the operational state of an aircraft. An operating state of an aircraft may include a state of one or more components in or on the aircraft as well as indications of environmental conditions in which the aircraft is operating.

According to the present example, the operating inputs 114 represent at least one of an operational state of at least one component associated with the aircraft system and an output from at least one sensor configured to sense a respective environmental condition. The operational state of the aircraft may be an instantaneous state of the aircraft, wherein the operating inputs 114 represent a state of one or more components or environmental conditions at a given moment, or at consecutive moments, in time. Alternatively, the operating inputs 114 may represent a dynamic state of an aircraft, wherein the operating inputs 114 comprise values representing a period of time in the operation of the aircraft, in which case the operating inputs 114 comprises a plurality of dynamically changing values representing each input.

The operating inputs 114 may include control inputs. Such a control input may be representative of aircrew, such as a pilot, operating or actuating a device, apparatus or system in the aircraft. Control inputs may include a value of a control input, for example, a value representing the position of a throttle, a braking actuator, and/or other control inputs. Alternatively, or additionally, a control input may comprise a rate of change rather than a value. In some examples, the control input may be a multivariate quantity indicating both an instantaneous value (e.g. a position) and a rate and/or direction of change. The control input may be represented by a plurality of values or a plurality of multi-variate quantities expressing an operation of a device, apparatus or system over a defined period. The control input may include a value representing a difference between the control input and a further control input, for example a difference between the position of a first throttle corresponding to a first engine and the position of a second throttle corresponding to a second engine.

The classifier outputs 116 are outputs for controlling the at least part of an aircraft system. The control outputs 116 are generated by processing the operating inputs 114 using the trained classifier to generate classifier outputs 116. The classifier outputs 116 can be used in an aircraft, to control at least part of the aircraft system which the trained classifier is configured to control. For example, the classifier outputs 116 may represent signals, or low-level computing instructions, for actuating equipment or components in the at least part of the aircraft system. Alternatively, the classifier outputs 116 may represent high-level computing instructions which are used to control a fly-by-wire aircraft system.

In the example shown in FIG. 1, the scenario data 112 is stored in the memory 102. In this case, obtaining the scenario data 112 may comprise reading the scenario data from the memory 102. In other examples, not shown, obtaining 202 the scenario data 112 includes receiving the scenario data 112 using the interface(s) 110. The scenario data 112 may be transmitted to, and received by, the test apparatus 100 over a communications interface 110 configured to communicate with one or more external computing devices over a wired or wireless connection.

Turning to FIG. 3, the scenario data 112 is shown to comprise separate operating inputs 114A to 114D, and separate classifier outputs 116A to 116D for each aircraft operating scenario 1 to n. Operating inputs 114A corresponding to a given scenario may be stored with the respective classifier outputs 116A corresponding to the given scenario. In some cases, the scenario data 112 may include an indication of which operating inputs 114A to 114D correspond to which classifier outputs 116A to 116D, for example in the form of a linked list, a table, an identification number, and so forth.

Model data 118 representing a model 120 of the at least part of the aircraft system is obtained 204, either from memory 102, or via an interface 110. The model 120 is implemented in software and may represent the operation of the at least part of the aircraft system. For example, the model 120 may be configured to receive a control signal, representing an instruction to control one or more components in the aircraft system, and may generate a state signal representing an outcome of the operation of the at least part of the aircraft system in response to the control signal. Alternatively, or additionally, the model 120 may include a graphical representation of the aircraft system and on receipt of a control signal, the model 120 may modify the graphical representation to represent an outcome of the control signal. Specific examples of models will be described further below in relation to FIGS. 4 to 8.

Error categorisation data 302 is generated 206 for each aircraft operating scenario based on respective classifier outputs 116A applied to the model 120. Separate error categorisation data 302A to 302D for each scenario 1 to n is shown in FIG. 3. In some cases, the error categorisation data 302A to 302D may be combined with the scenario data 112 such that it is stored alongside and associated with the respective portions of scenario data.

Generating the error categorisation data 302A, for a given scenario, may comprise evaluating how the model 120 operates, or would operate, when controlled using the respective classifier outputs 116A. This may include, for example, providing one or more control signals indicative of the classifier outputs 116 to the model 120 and evaluating how the model 120 operates in response to these classifier outputs 116.

For each scenario represented in the scenario data 112, the error categorisation data 302A to 302D may be indicative of whether an error is detected in the respective classifier outputs 116A to 116D. If an error is detected in the respective classifier outputs 116A to 116D for a scenario, the error categorisation data 302A to 302D may also include an indication of an error category for the detected error. The error categorisation data 302 can be implemented in any of a plurality of ways. In one example, the error categorisation data 302 may include one or more flags associated with respective portions of scenario data 112 corresponding to the scenario. Alternatively, or additionally, the error categorisation data 302 may include more detailed information relating to the error such as an indication of a particular output in the classifier outputs 116A caused the error.

The error categorisation data 302A, as well as being indicative of whether an error has been detected in classifier outputs 116A, may also indicate if an error has not been detected in the classifier outputs 116A. This can be implemented either by a null value stored in an argument, which would otherwise indicate an error, or a lack of a data value in one or more portions of data.

Identifying and categorising errors in the classifier outputs 116, as in the error categorisation data 302, allows a developer to obtain a more detailed understanding of errors generated by the trained classifier and can indicate more likely potential sources of that error. This in turn enables a developer to more quickly identify the actual source of an error so that it can be corrected.

As described above with respect to FIG. 1, the operating inputs 114A to 114C may include indications of the condition of one or more components or equipment in the aircraft and/or indications of environmental conditions in which the aircraft is operating for a given scenario. In this case, the operating inputs 114A to 114C may influence the model 120 if, for example, certain components or functions of the aircraft are not available in a given scenario. Generating the error categorisation data 302A for a given scenario may include modifying the model 120 represented by the model data 118 according to respective operating inputs 114A and evaluating how the modified model 120 operates, or would operate, when controlled using the respective classifier outputs 116A.

In this way, it becomes possible to more accurately model the at least part of the aircraft system when evaluating outputs of the trained classifier and hence detect errors which might otherwise be missed when evaluating the model 120. For example, where the operating inputs 114A for a given scenario indicate that a given component of the aircraft is not operable in this scenario, a classifier output 116A, which indicates that this component should be used, would be erroneous. Although in other scenarios, where the given component is operable, this classifier output 116A would not be erroneous.

In the example shown in FIG. 3, the scenario data 112 also includes operating outputs 304 that are generated by operating the at least part of the aircraft system based on the operating inputs 114. That is to say that the scenario data 112 may include outputs 304 representing how a known, or established, aircraft control system would operate the at least part of the aircraft system in each of the scenarios. These operating outputs 304 may represent an expected behaviour of the aircraft control system which the trained classifier is attempting to emulate. The scenario data 112 may comprise separate operating outputs, 304A to 304C, for each scenario which is suitable for controlling the at least part of the aircraft system in a respective scenario.

Where the scenario data 112 comprises operating outputs 304, generating the error categorisation data 302A for a given scenario may comprise evaluating how the model 120 would operate when controlled using respective classifier outputs 116A in comparison to how the model 120 would operate when controlled using respective operating outputs 304A. In other words, the operating outputs 304A, which represent a known (or "ground-truth") operation of the at least part of the aircraft control system, may be used to identify whether the respective classifier outputs 116A include an error.

Figure 4:
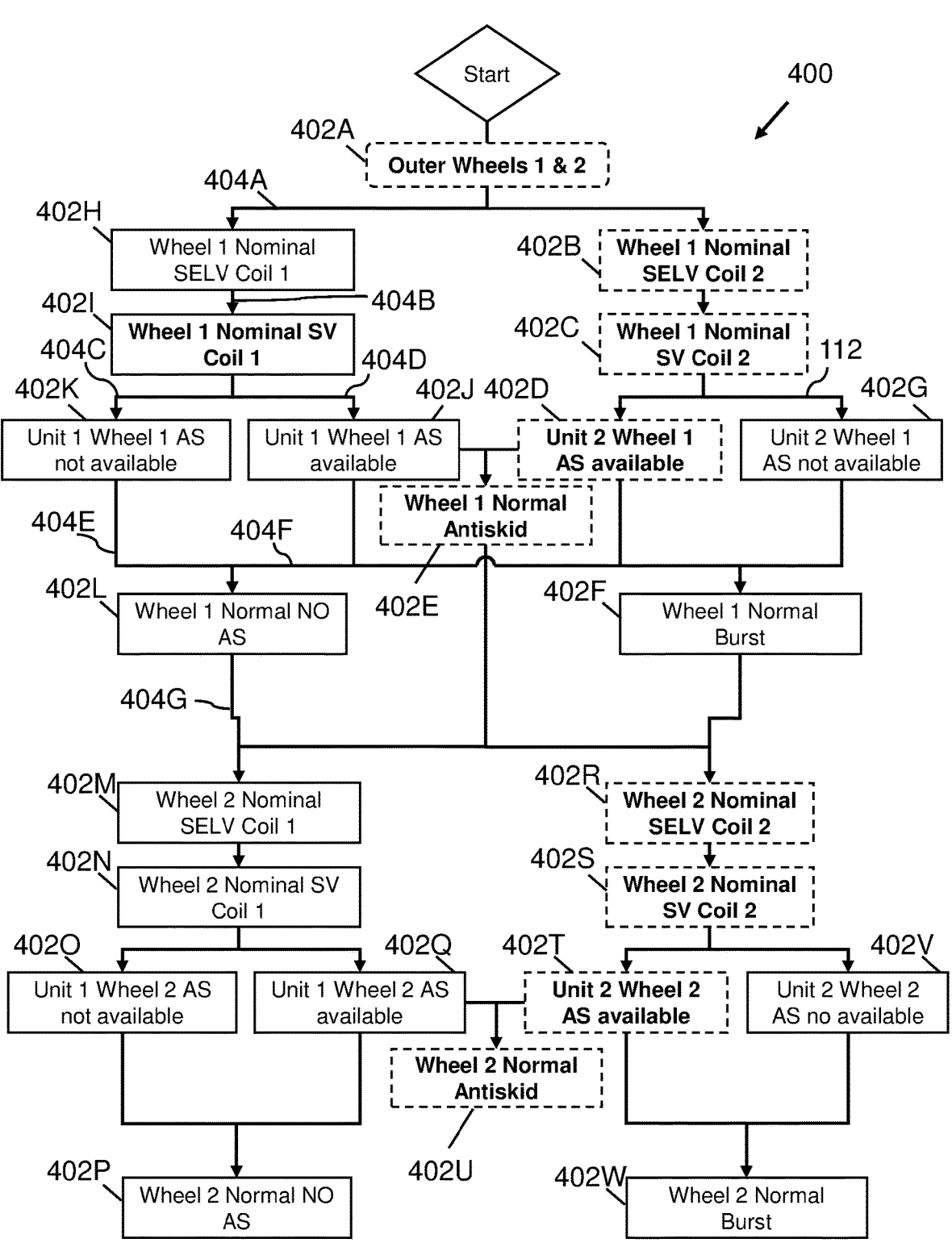
FIG. 4 is a schematic diagram illustrating a graph model according to an example in which the at least part of aircraft system is a braking system in a first scenario.

Turning now to FIG. 4, an example is shown in which the model 120 is a graph model 400 comprising a set of nodes 402A to 402W connected by a corresponding set of directed edges 404A to 404G. Only five of the directed edges 404A to 404G have been labelled in the Figures for clarity. The set of nodes 402A to 402W each represent a function of a component, or a piece of equipment, in the at least part of the aircraft system. In the present example each node 402A to 402W represents an operational mode of a component in the aircraft system. These operational modes may include controlling a plurality of lower level components to provide these operational modes. However, in other examples, not shown, some or all nodes 402A to 402W may represent low-level operations, such as the actuation of a valve or switch. The directed edges 404A to 404G indicate a control flow which defines the dependencies between nodes 402A to 402W.

In the examples described in relation to FIGS. 4 to 8 below, the aircraft system is a braking control system. The part of the braking control system shown in the graph model 400 represents the braking system for a first wheel and a second wheel of an aircraft according to primary braking componentry. In particular, the nodes 402A to 402W show how different actuators and controllers in the braking control system can be activated to put each of the wheels in a normal antiskid braking mode 402E and 402U, a burst mode 402F and 402W, or a no antiskid braking mode 402L and 402P.

It is to be appreciated that the model 400 shown in FIGS. 4 to 8 is simplified for the purposes of explanation, and that in a real application the braking system may include many more modes, components, and operational outcomes than those shown in and described with respect to the graph model 400.

Where the model 120 is a graph model 400, generating error categorisation data 302A for a given aircraft operating scenario may comprise mapping the respective classifier outputs 116A to nodes 402A to 402W in the graph model 400 to identify nodes that are activated according to the respective classifier outputs 116A. The activated nodes 402A to 402E and 402R to 402U are shown in FIG. 4 with broken lines. In the present example, the classifier outputs 116A have correctly controlled the braking system to put the first wheel in a normal antiskid mode 402E and to put the second wheel in a normal antiskid braking mode 402U.

Figure 5:
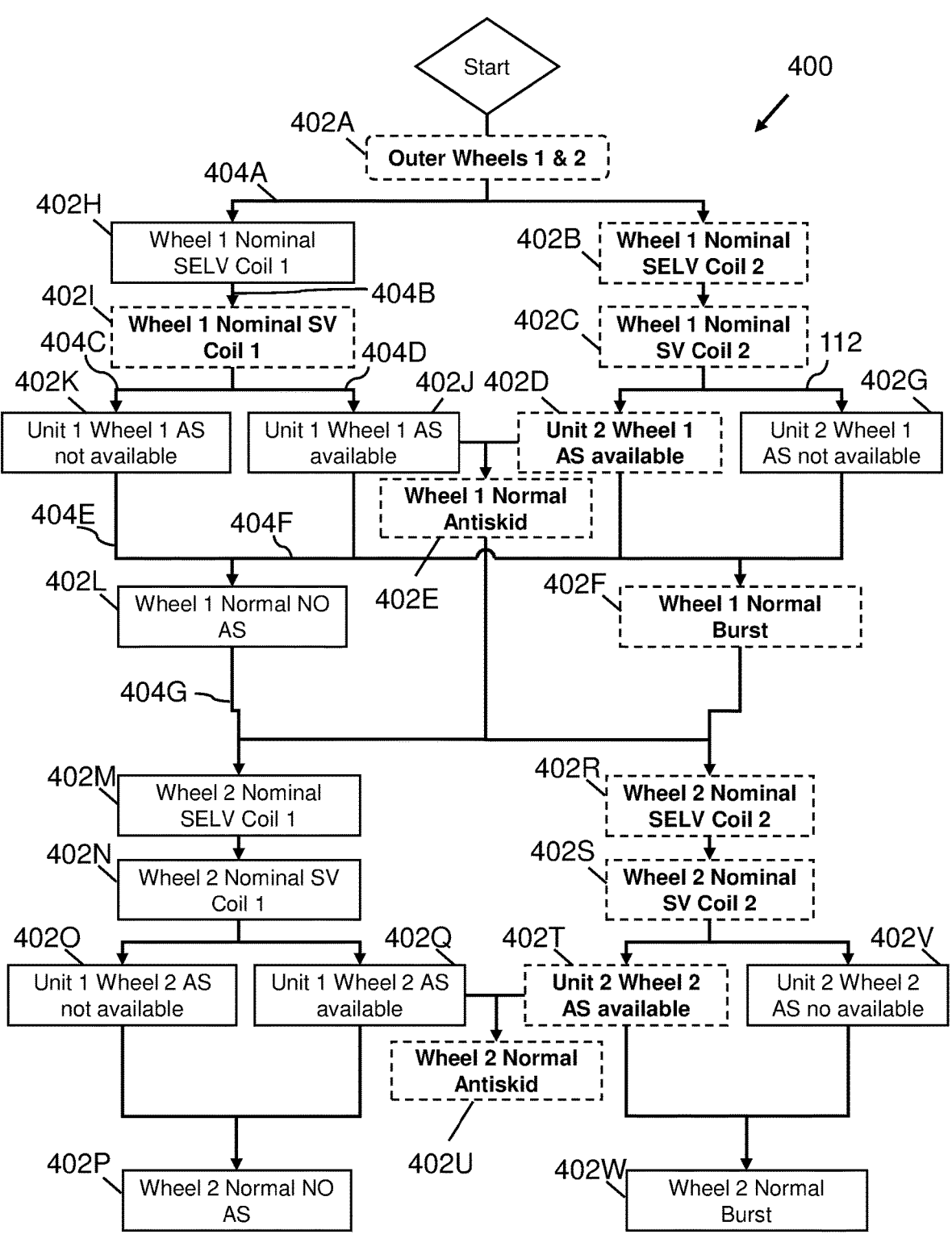
FIG. 5 is a schematic diagram illustrating a graph model according to an example in which the at least part of aircraft system is a braking system in a second scenario.

The error category for a detected error may be any one of a plurality of potential error categories. FIG. 5 shows an example of a first potential error category that is indicative of the operation of two components in the at least part of the aircraft system that are incompatible. In the present example a set of classifier outputs 116B, for a different scenario to the one shown in FIG. 4, have been applied to the model 120 and the active nodes 402A to 402G, 402I, 402R to 402U have been drawn in broken lines. In this case, both a first coil 402I and a second coil 402C have been activated according to the classifier outputs 116A. The activation of two incompatible nodes 402I and 402C, in this case trying to operate the brake using two separate coil systems, at the same time can lead to unpredictable behaviours in the braking system and is undesirable. Hence, this behaviour is categorised as an error.

FIG. 5 also shows a second error category that is indicative of the simultaneous operation of a component in the at least part of the aircraft system according to two contradictory operation modes. In this example, the brake for the first wheel has been operated according to both a normal antiskid mode 402E and in a burst mode 402F. It is not possible to simultaneously operate the brake for the first wheel according to two different modes and hence this is categorised as an error. Both the first error category and the second error category may be referred to as clash errors as they represent a clash between two or more nodes in the graph model 400.

Figure 6:
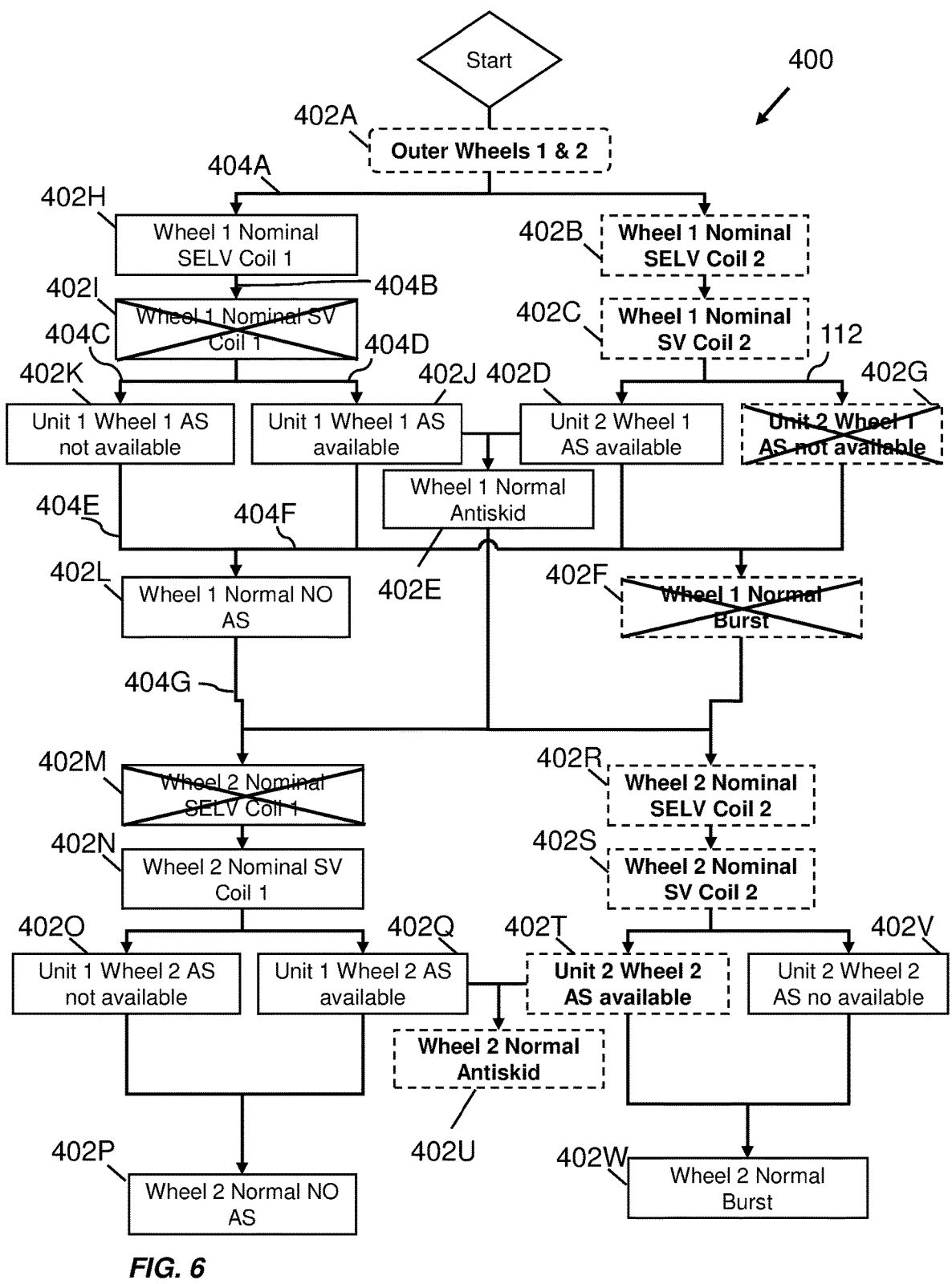
FIG. 6 is a schematic diagram illustrating a graph model according to an example in which the at least part of aircraft system is a braking system in a third scenario.

FIG. 6 shows an example of a third error category that is indicative of an operation of a component in the aircraft system in a manner that is incompatible with the given scenario. The classifier outputs 116C for a given scenario, that is different to the scenarios illustrated in FIGS. 4 and 5, have been mapped to respective nodes 402A, 402B, 402C, 402G, 402F, 402R, 402S, 402T, 402U. In this scenario several of the nodes 402I, 402M, 402G, 402F in the graph model 400 are not available to be activated, these are shown in FIG. 6 with a cross through the node. The inability to activate a nodes 402I, 402M, 402G, 402F may be due to failures in associated components in the braking system, environmental constraints in the given scenario, and so forth. Restrictions on nodes that can and/or cannot be activated may vary between scenarios. In some examples, respective operating inputs 114C for this scenario may include an indication of which nodes 402I, 402M, 402G, 402F cannot be successfully activated. The graph model 400 has been modified to reflect these restrictions represented in the operating inputs 114C. An operation of the model 400 is then evaluated, for example, by evaluating which nodes have been activated using the classifier outputs 116C. If any of the activated nodes 402A, 402B, 402C, 402G, 402F, 402R, 402S, 402T, 402U match the nodes 402I, 402M, 402G, 402F which are unavailable in the present scenario, then it may be determined that an error of the third error category is present. Errors belonging to this third error category may be referred to as impossible errors, as operating the braking system in this manner is not possible.

Figure 7:
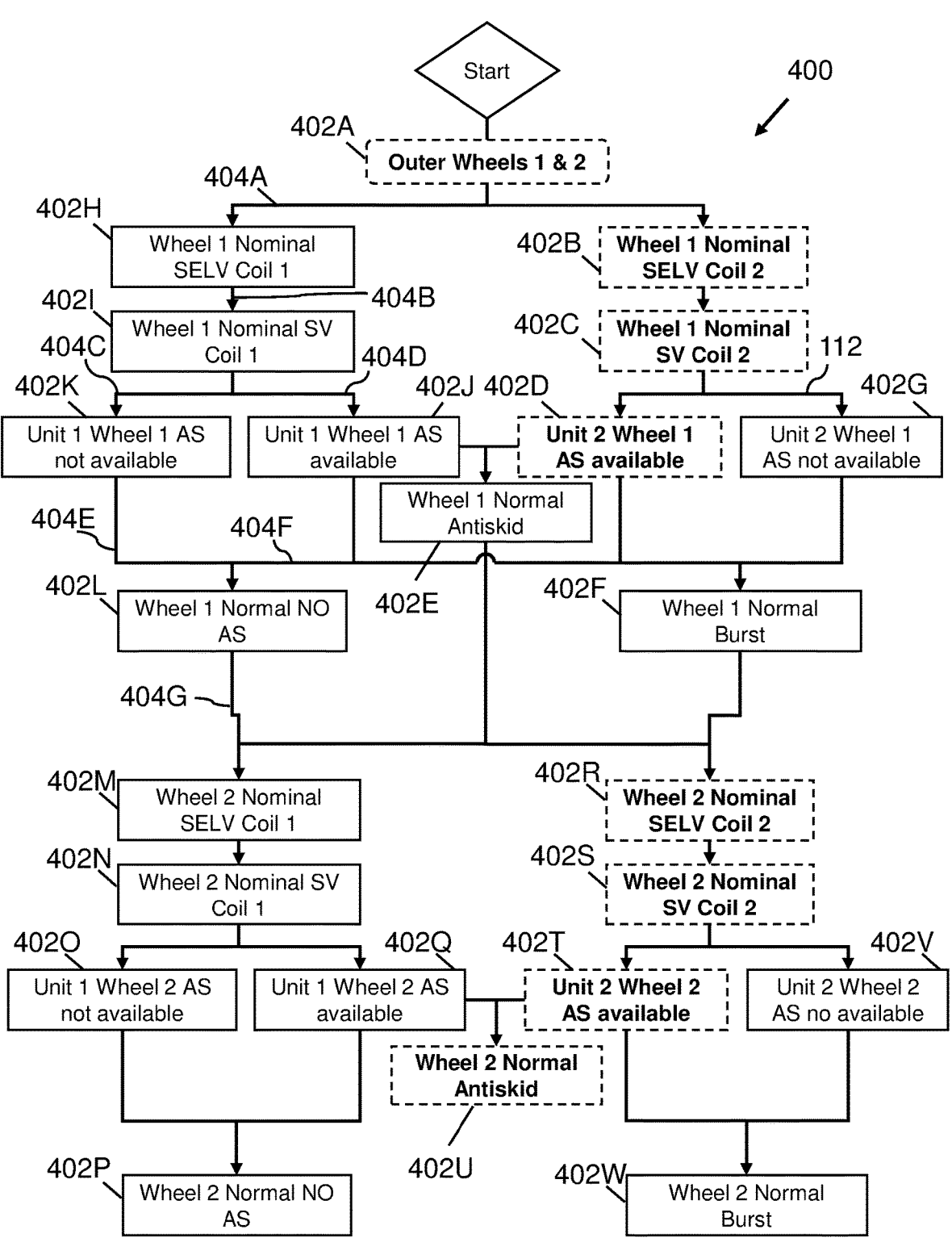
FIG. 7 is a schematic diagram illustrating a graph model according to an example in which the at least part of aircraft system is a braking system in a fourth scenario.

FIG. 7 shows an example of a fourth error category that is indicative of an incomplete operation of the at least part of the aircraft system for the scenario. The classifier outputs 116D for a fourth scenario, different to the scenarios illustrated in FIGS. 4 to 6, are mapped to respective nodes 402A, 402B, 402C, 402D, 402R, 402S, 402T, 402U. The model 400 is then evaluated to see how it operates when controlled using the classifier outputs 116D. It is determined from this evaluation that no braking is applied to the first wheel as none of the normal antiskid 402E, normal burst 402F, or normal no antiskid 402L nodes have been activated when the classifier outputs 116C are applied to the model. This incomplete operation of the braking system is detected as an error and categorised in the fourth category of error. Errors of this type may be referred to as incomplete errors as the trained classifier has not operated the braking control system completely. Evaluating the model 400 in this case may include assessing the activated nodes 402A, 402B, 402C, 402D, 402R, 402S, 402T, 402U to determine whether each node is connected to a subsequent node by a directed edge. If two or more of the nodes are not connected to the other nodes by a directed edge, then an incomplete error may be detected.

In the examples described above in relation to FIGS. 4 to 7, evaluating how the model 400 operates includes assessing which nodes have been activated and determining whether there are any clashes, incomplete paths, or attempts at operating the model in a manner which is not possible. It will be appreciated, however, that these categories of errors can also be determined using other model types. For example, the braking system may be represented using a state machine model.

In some cases, the behaviour of the trained classifier in a given scenario, represented by the classifier outputs 116, may not be erroneous according to the error categories described above, but may differ from the expected behaviour of a known aircraft control system.

The method 200 may include processing the error categorisation data 302 to identify a first subset of the scenarios for which no error is detected. In the examples described herein, error categorisation data 302A is indicative of there being no error in the classifier outputs 116A for the first scenario, shown in FIG. 4. This scenario is therefore identified as belonging to the first subset of scenarios. The scenario data 112, including the operating outputs 304A and the classifier outputs 116A that correspond to this scenario of the first subset of scenarios, may be processed to determine if the operation of the model 400 differs when controlled using the classifier outputs 116A and the operating outputs 304A. This may be repeated for each scenario in the first subset of scenarios, to identify a second subset of the scenarios.

Figure 8:
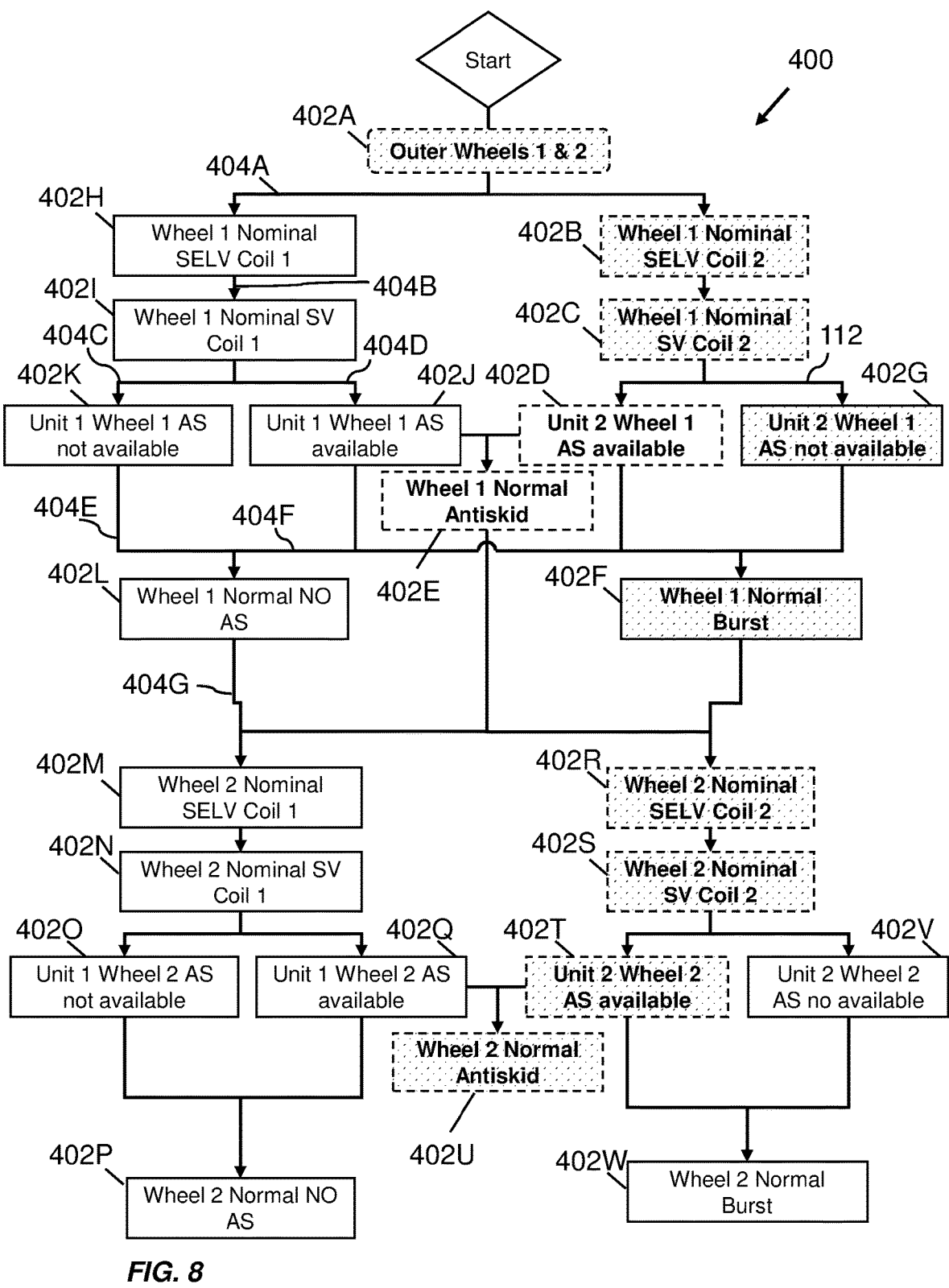
FIG. 8 is a schematic diagram illustrating a graph model according to an example in which the at least part of aircraft system is a braking system in first scenario and shows respective classifier outputs and operating outputs.

FIG. 8 shows an example in which classifier outputs 116A and operating outputs 304A have been mapped to the model 400. The nodes 402A to 402C, 402G, 402F, 402R to 402U activated by the operating outputs 304A are shown with dot matrix shading, while the nodes 402A to 402E, and 402R to 402U are shown in broken lines. The differences between the nodes activated by the operating inputs 304A and the nodes activated by the classifier outputs 116A are identified and this scenario is selected as a scenario for the second subset of scenarios. Identifying scenarios in which the behaviour of the trained classifier differs to the expected behaviour of corresponding aircraft control systems is important to allow developers to get a better understanding of their trained classifier, and to demonstrate their investigation of differences in control behaviour for the relevant authorities.

While the trained classifier may on occasion generate classifier outputs 116A which differ to the respective operating inputs 114A expected in the given scenario, these classifier outputs 116A may not be erroneous and may instead represent an alternative way in which to control the aircraft system. In these circumstances it is desirable to determine whether the difference between the trained classifier's behaviour and the expected behaviour of an aircraft control system is acceptable or should be corrected.

To this end, the method 200 may include evaluating a performance of the respective classifier outputs 116A corresponding to the second subset of scenarios. Evaluation data may be generated, that is indicative of the performance of the respective classifier outputs 116A. In particular, the evaluation data may indicate whether classifier outputs 116A for a scenario meet a predetermined performance threshold. The predetermined performance threshold may be represented in the performance threshold data 122.

One or more performance values, representing a measure of performance, may be determined for the classifier outputs 116A. These performance values may be compared to one or more threshold values representing a minimum, or expected, performance of an aircraft system. The evaluation data may include an indication of the performance values and the threshold values, a difference between the performance values and the threshold values, or an indication of a comparison between the performance values and the threshold values.

Where the aircraft system is a braking control system, these performance values may be measures of variables such as braking force applied, estimated braking distance required, maximum temperature of brakes during braking, or any other suitable metric for evaluating braking performance.

The model 120 or 400 may be used to evaluate the performance of the classifier outputs 116A. For example, the model may be used to calculate one or more simulated performance values representing a performance of the aircraft system. The simulated performance values may then be compared to expected performance threshold values to determine whether the classifier outputs 116A meet, or exceed, the predetermined performance thresholds.

Figure 9:
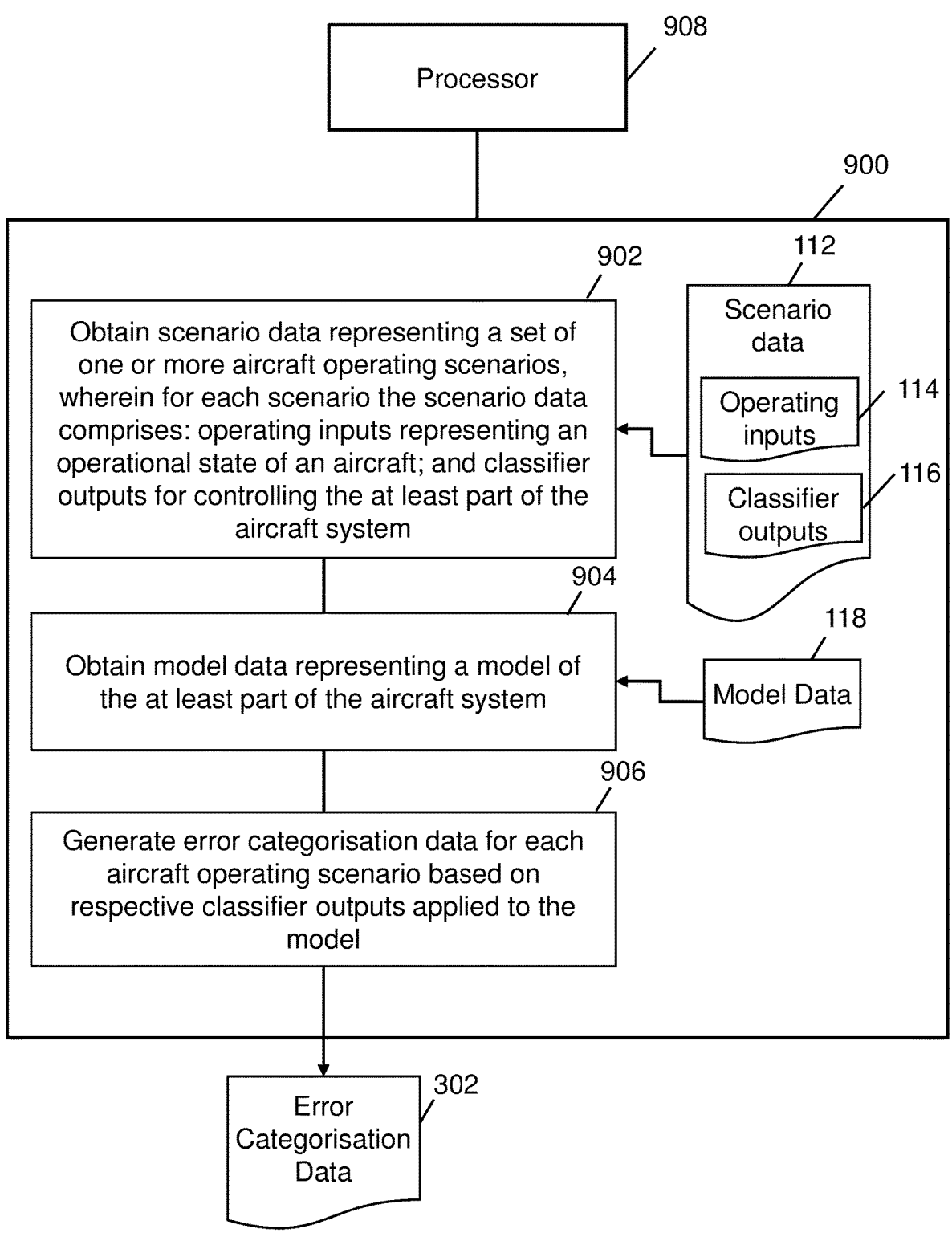
FIG. 9 is a schematic diagram illustrating a non-transitory computer-readable storage medium according to examples.

FIG. 9 shows a non-transitory computer-readable storage medium 900 comprising computer-executable instructions 902 to 906 which, when executed by a processor 908, cause the processor 908 to perform the method 200. A first set of instructions 902 causes the processor to obtain scenario data 112 representing one or more aircraft operating scenarios. The scenario data 112 comprises operating inputs 114, representing an operational state of an aircraft, and classifier outputs 116, for controlling the at least part of the aircraft system, for each scenario.

A second set of instructions 904 cause the processor to obtain model data 118 representing a model 120 of at least part of the aircraft system. A third set of instructions 906 generate error categorisation data 302 for each aircraft operating scenario based on respective classifier outputs 116 applied to the model 120.

Figure 10:
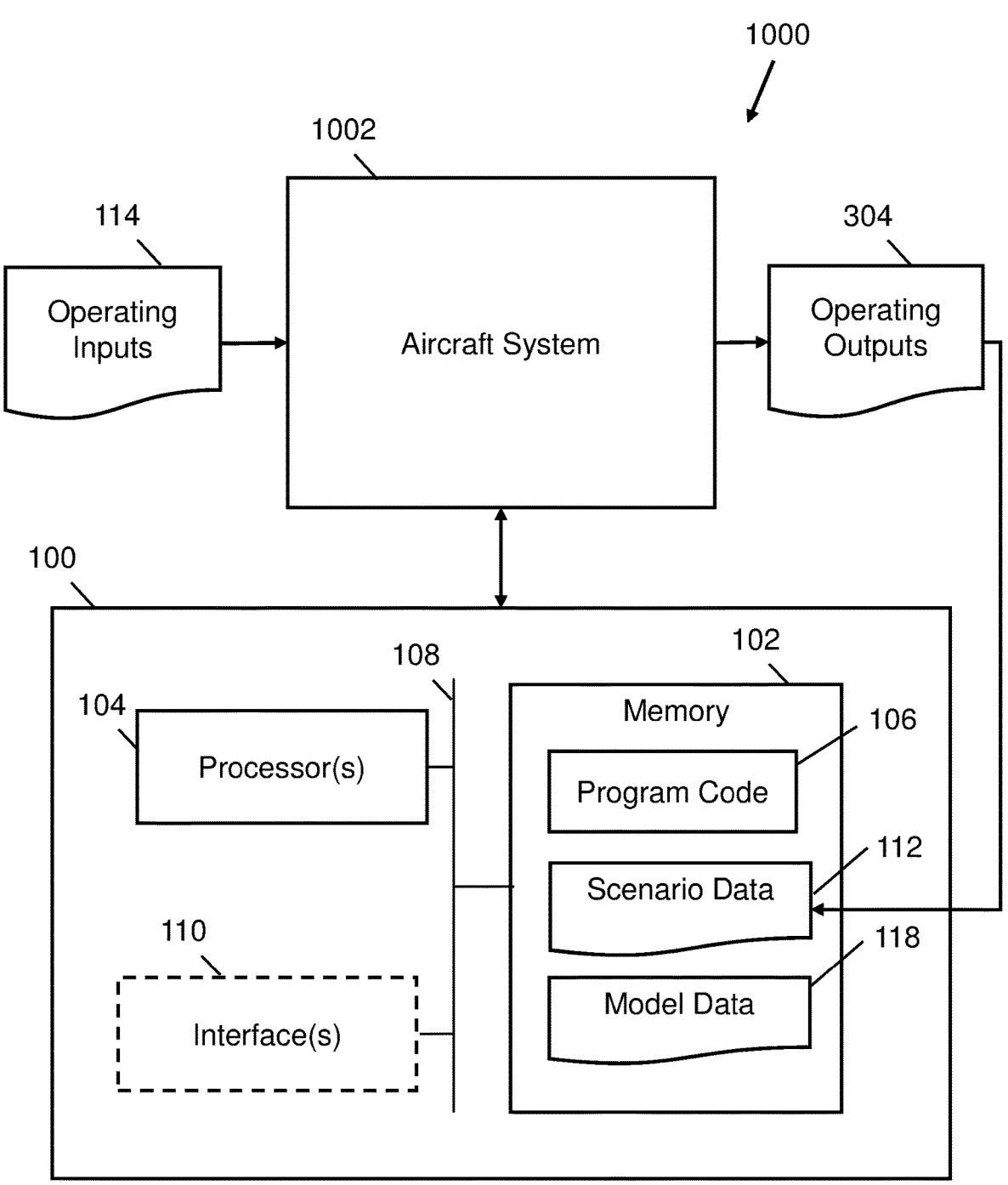
FIG. 10 is a schematic diagram illustrating a test system comprising a test apparatus and at least part of an aircraft system according to examples.

FIG. 10 shows a test system 1000 that comprises the test apparatus 100, and the at least part of the aircraft system 1002. As described above, at least part of the aircraft system 1002 may be used to generate the operating outputs 304 by controlling it using the operating inputs 114. The test apparatus 100 is in communication with the aircraft system 1002 and may obtain the operating outputs 304 from the at least part of the aircraft system 1002. The test apparatus 100 may be configured to communicate with the aircraft system on-the-fly to obtain operating outputs for a given scenario being tested. Where the aircraft system is a braking system, the at least part of the aircraft system 1002 may include hardware components, such as physical componentry used in the braking system, software components implemented in the braking system, or any suitable combination of hardware and software components.

The test system 1000 may be implemented in a testing facility in which the aircraft system is removed from, or not installed in, an operational aircraft. Alternatively, the test system 1000 may be included in an operational aircraft wherein live operating inputs 114 and operating outputs 304 are provided to the test apparatus 100.

The invention claimed is:

1. A test apparatus for testing a trained classifier configured to control at least part of an aircraft system, the apparatus comprising a least one memory and at least one processor, the test apparatus comprising program code stored in the at least one memory and that, when executed by the at least one processor, causes the test apparatus to:

obtain scenario data representing one or more aircraft operating scenarios, wherein for each of the one or more aircraft operating scenarios the scenario data comprises:

operating inputs representing an operational state of an aircraft; and classifier outputs for controlling the at least part of the aircraft system, the classifier outputs being generated by processing the operating inputs using the trained classifier;

obtain model data representing a model of the at least part of the aircraft system; and generate error categorisation data for each of the one or more aircraft operating scenarios based on a response of the model to the classifier outputs of the respective operating scenario being applied to the model.

2. The test apparatus according to claim 1, wherein, for each of said aircraft operating scenarios, generating the error categorisation data comprises evaluating how the model would operate when controlled using the respective classifier outputs.

3. The test apparatus according to claim 1, wherein, for each of said aircraft operating scenarios, generating the error categorisation data comprises:

modifying the model represented by the model data according to respective operating inputs; and evaluating how the modified model would operate when controlled using the respective classifier outputs.

4. The test apparatus according to claim 1, wherein for each of said aircraft operating scenarios the scenario data comprises operating outputs for controlling the at least part of the aircraft system, the operating outputs being generated by operating the at least part of the aircraft system based on respective operating inputs, and wherein, for the respective said aircraft operating scenario, generating the error categorisation data comprises evaluating how the model would operate when controlled using respective ones of the classifier outputs in comparison to how the model would operate when controlled using respective operating outputs.

5. The test apparatus according to claim 1, wherein the model is a graph model comprising a set of nodes connected by a corresponding set of directed edges, each node representing a function of a component in the at least part of the aircraft system, and wherein generating error categorisation data for a respective one of said aircraft operating scenarios comprises:

mapping respective classifier outputs to nodes in the graph model to identify nodes that are activated according to the respective classifier outputs; and evaluating how the model operates according to the activated nodes.

6. The test apparatus according to claim 1, wherein the error categorisation data for a respective one of said aircraft operating scenarios is indicative of:

whether an error is detected in the respective classifier outputs; and in the event that an error is detected in the respective classifier outputs, an error category for the detected error.

7. The test apparatus according to claim 6, wherein the error category is one of a plurality of error categories, and wherein the plurality of error categories comprises any two or more of:

a first error category that is indicative of an operation of two components in the at least part of the aircraft system that are incompatible;

a second error category that is indicative of a simultaneous operation of a component in the at least part of the aircraft system according to two contradictory operation modes;

a third error category that is indicative of an operation of a component in the aircraft system in a manner that is incompatible with the said scenario; and a fourth error category indicative of an incomplete operation of the at least part of the aircraft system for the said scenario.

8. The test apparatus according to claim 1, wherein for each of the aircraft operating scenarios, the scenario data comprises operating outputs for controlling the at least part of the aircraft system, wherein the operating outputs are generated by operating the at least part of the aircraft system based on respective operating inputs, and wherein the program code, when executed by the at least one processor, causes the test apparatus to:

process the error categorisation data to identify a first subset of the aircraft operating scenarios for which no error is detected; and process scenario data corresponding to the first subset of the aircraft operating scenarios to identify a second subset of the aircraft operating scenarios for which an operation of the model when controlled using the respective classifier outputs differs to an operation of the model when controlled using the respective operating outputs.

9. The test apparatus according to claim 8, wherein the program code, when executed by the at least one processor, causes the test apparatus to:

evaluate a performance of the respective classifier outputs corresponding to the second subset of aircraft operating scenarios; and generate evaluation data indicative of the performance of the respective classifier outputs corresponding to the second subset of the aircraft operating scenarios.

10. The test apparatus according to claim 9, wherein for at least one of the second subset of the aircraft operating scenarios the evaluation data indicates whether respective classifier outputs corresponding to the at least one of the second subset of the aircraft operating scenarios meet a predetermined performance threshold.

11. The test apparatus according to claim 1, wherein the aircraft system is a braking control system.

12. A computer-implemented method for testing a trained classifier configured to control at least part of an aircraft system, the computer-implemented method comprising:

obtaining scenario data representing one or more aircraft operating scenarios, wherein for each of the one or more aircraft operation the scenario data comprises:

operating inputs representing an operational state of an aircraft; and classifier outputs for controlling the at least part of the aircraft system, the classifier outputs being generated by processing the operating inputs using the trained classifier;

obtaining model data representing a model of the at least part of the aircraft system; and generating error categorisation data for each of the one or more aircraft operating scenarios based on a response of the model to the classifier outputs of the respective aircraft operating scenario being applied to the model.

13. The computer-implemented method according to claim 12, wherein, for a respective one of said aircraft operating scenarios, generating the error categorisation data comprises evaluating how the model would operate when controlled using the respective classifier outputs.

14. The computer-implemented method according to claim 12, wherein for a respective one of said aircraft operating scenarios, generating the error categorisation data comprises:

modifying the model represented by the model data according to respective operating inputs corresponding to the said scenario; and evaluating how the modified model would operate when controlled using the respective classifier outputs corresponding to the said scenario.

15. The computer-implemented method according to claim 12, wherein for each of the aircraft operating scenarios the scenario data comprises respective operating outputs for controlling the at least part of the aircraft system, the operating outputs being generated by operating the at least part of the aircraft system based on respective operating inputs, and wherein, for the aircraft operating scenario, generating the error categorisation data comprises evaluating how the model would operate when controlled using respective classifier outputs in comparison to how the model would operate when controlled using respective operating outputs.

16. The computer-implemented method according to claim 12, wherein the model is a graph model comprising a set of nodes connected by a corresponding set of directed edges, each node representing a function of a component in the at least part of the aircraft system, and wherein generating error categorisation data for a respective one of said aircraft operating scenarios comprises:

mapping respective classifier outputs to nodes in the graph model to identify nodes that are activated according to the respective classifier outputs; and evaluating how the model operates according to the activated nodes.

17. The computer-implemented method according to claim 12, wherein the error categorisation data for a respective one of said aircraft operating scenarios is indicative of:

whether an error is detected in the respective classifier outputs; and if an error is detected in the respective classifier outputs, an error category for the detected error.

18. The computer-implemented method according to claim 17, wherein the error category is one of a plurality of error categories, and wherein the plurality of error categories comprises any two or more of:

a first error category that is indicative of an operation of two components in the at least part of the aircraft system that are incompatible;

a second error category that is indicative of a simultaneous operation of a component in the at least part of the aircraft system according to two contradictory operation modes;

a third error category that is indicative of an operation of a component in the aircraft system in a manner that is incompatible with the said scenario; and a fourth error category indicative of an incomplete operation of the at least part of the aircraft system for the said scenario.

19. The computer-implemented method according to claim 12, wherein for each of the aircraft operating scenarios the scenario data comprises operating outputs for controlling the at least part of the aircraft system, wherein the operating outputs are generated by operating the at least part of the aircraft system based on respective operating inputs, and wherein the method comprises:

process the error categorisation data to identify a first subset of the aircraft operating scenarios for which no error is detected; and process scenario data corresponding to the first subset of the aircraft operating scenarios to identify a second subset of the aircraft operating scenarios for which an operation of the model when controlled using the respective classifier outputs differs to an operation of the model when controlled using the respective operating outputs.

20. The computer-implemented method according to claim 19, wherein the method comprises:

evaluate a performance of the respective classifier outputs corresponding to the second subset of aircraft operating scenarios; and generate evaluation data indicative of the performance of the respective classifier outputs corresponding to the second subset of aircraft operating scenarios.

* * * * *